3,271,492
METHOD OF MAKING A NON-POROUS BOARD COMPOSED OF STRANDS OF WOOD AND PORTLAND CEMENT
Armin Elmendorf, Palo Alto, Calif., assignor to Elmendorf Research Inc., Palo Alto, Calif., a corporation of Illinois
Continuation of application Ser. No. 191,244, Apr. 30, 1962. This application Feb. 1, 1965, Ser. No. 431,760
6 Claims. (Cl. 264—122)

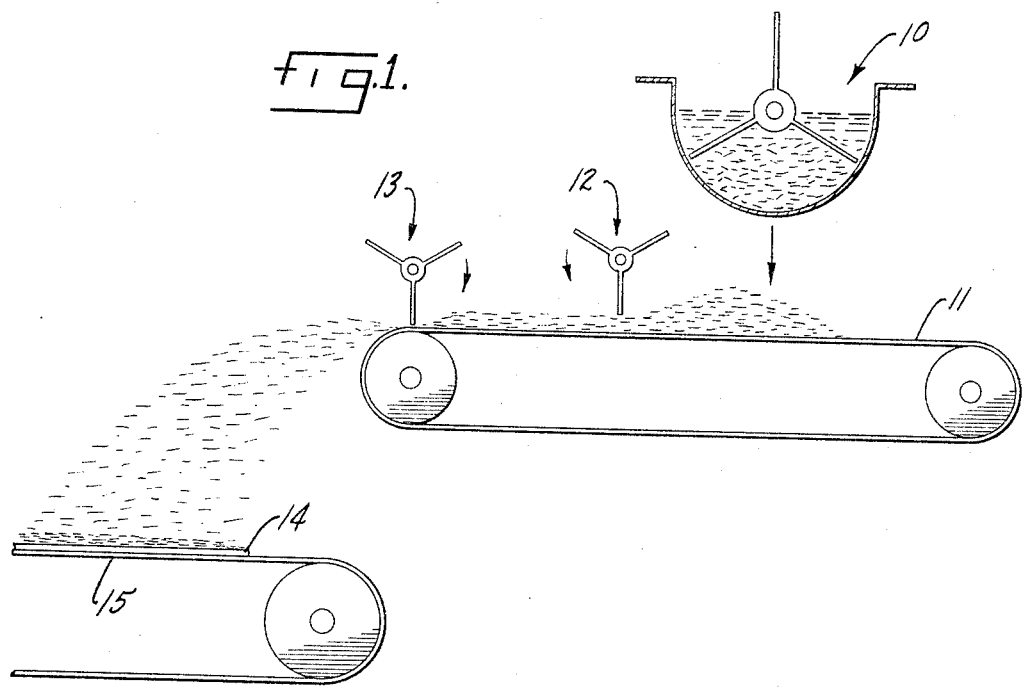
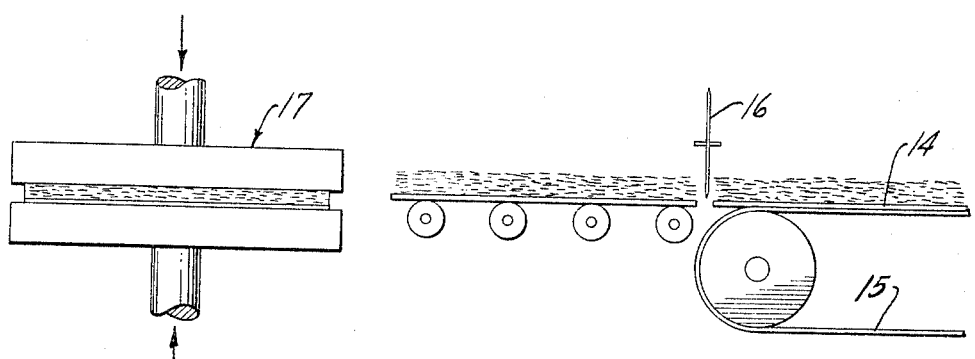

This invention relates to a method of forming a non-porous board composed of Portland cement and wood shavings. This application is a continuation of U.S. application Serial Number 191,244 filed April 30, 1962 and now abandoned.

A primary purpose of the invention is a method for forming a mat of wood shavings coated with cement by air felting on a moving support.

Another purpose is a method of forming a building board composed of wood savings and Portland cement by air felting which is highly weather resistant and which can be nailed or sawed.

Another purpose is a method of forming a board composed of wood strands and Portland cement by air felting in which the strands are either randomly positoned or oriented into parallelism.

Another purpose is a method for forming a building board by air felting cement-covered wood strands in steps where prescribed ratios of cement, wood and water are used in order to successfully form a board of uniform density and the desired strength.

Other purposes will appear in the ensuing specification, drawings and claims.

The invention is illustrated diagrammatically in the following drawings wherein:

FIGURE 1 is a diagrammatic illustration of three steps in the method, namely, the mixing of the materials, the continuous metering of the coated shavings and thirdly the separation of the coated shavings and depositing them individually on a moving support by air felting, and FIGURE 2 shows the severing of the mat into board lengths corresponding to the length of the supporting cauls, and subsequent pressing. This figure also shows the final step of pressing.

The present process may be used to form a board of cement, preferably Portland cement, and wood strands or shavings. The board may be of the type illustrated in my Patent, 2,697,677, in which the strands are randomly arranged within the board. The present process may also be used to form a board of cement and wood strands in which the strands are oriented within the board, as in my co-pending application Serial No. 24,809, filed April 26, 1960, entitled "Composite Board Made of Strands and a Binder." In the latter case, the strands are in general parallelism with the length of the board.

In order to form a board of the type described which will be a satisfactory commercial product, it must be weather-resistant as it may be exposed to the elements, and it must not be so dense that it cannot be both nailed and sawed. In order to form a board which meets these qualifications, the ratios or proportions of water, cement and wood strands must be rather closely regulated. Before describing the preferred ratios of the materials forming the board, the process itself will be described.

Considering FIGURE 1, wood shavings are coated with Portland cement in a mixer 10 shown diagrammatically as a tank containing the three basic ingredients, wood shavings, cement and water. The coated shavings are next transferred to a belt or other moving device 11. A typical metering device is shown diagrammatically at 12. It consists of rotating pins that remove the excess material and permit a predetermined mass of the coated shavings to move forward to the picker roll 13. Other metering means such as a continuous weighing belt or a spiral screw may also be used for regulating the amount of material that goes into the board. Such devices are well known and do not constitute part of the invention.

Experience has shown that it is preferable to add the water to the shavings before adding the cement, thereby insuring superior coating and superior adhesion of the cement to the strands. The water required for hydration of the cement then comes from the wet shavings.

A typical means for separating the coated shavings from the moving mass of shavings consists of a series of swinging pins that rotate and that separate individual coated shavings from the moving mass of shavings. A rotating wire brush may be used to serve the same purpose. Mechanical means used for air felting wood fibers coated with resin binders as in the manufacture of hardboards, separate such fibers in the form of tufts, each tuft consisting of many fibers. Removing clumps of cement-coated shavings is highly objectionable in the manufacture of wood-shaving-cement boards because the texture of the resultant board is made very uneven thereby, and commercially unsatisfactory. In order to obtain uniformity of texture in the end product, I have found it necessary to separate the shavings from the mass and to deposit them substantially as individual strands or shavings. Contrary to the procedure for air felting wood fibers coated with organic resin binders in the form of tufts, I have found that wood shavings coated with inorganic cements can be deposited individually by air felting. Under certain conditions substantially all of the coated shavings fall or rain through the air onto a succession of cauls 14 as individual shavings. The cauls may be supported on a moving belt 15.

FIGURE 2 shows a severing means 16 which may be a saw or a shear which separates the continuous mat of coated shavings into mats whose length corresponds to the length of the supporting cauls. Each caul with its mat is then transferred to a press 17 where it is compacted and allowed to remain under pressure until the cement has set. A series of cauls, each carrying its mat, may be stacked, and the stack so assembled is then subjected to pressure. The pressure is generally maintaind by means of retaining clamps as in the manufacture of plywood. Upon release of pressure the boards are dried and the moisture not required for hydration of the cement is thereby driven off.

In the manufacture of the present board produced by my process I prefer to use shavings in the form of strands or flakes of wood having an average thickness ranging from about .010-inch to .015-inch. Strands are narrow shavings. When the strands are to be oriented into parallelism they should be at least three times as long as they are wide.

The density of the finished board should range from about 0.9 to 1.4. When the density is lower than 0.9, the board is not sufficiently strong nor sufficiently weather-resistant to be a satisfactory commercial product. If the density is too high, greater than 1.4, the board is not practical as it cannot be sawed or nailed.

Three important ratios can be varied in the operation of my process. These ratios are interdependent. For a board which fulfills the requirements of nailability and weather-resistance and which, hence has a density ranging from .9 to 1.4, the ratio of dry cement to dry wood on a weight basis may range from about 1½; 1 to about 5:1. The quotient of such ratios and other ratios between these will also be expressed in different places of this disclosure. For example, the foregoing may be listed simply at 1.5 and 5, respectively. When the ratio of cement to wood is less than about 1.5 the board is no longer weatherproof. On the other hand, if the ratio is greater than about 5, it is difficult to form a mat of uniform density by air felting. In that case there may be more cement than the shaving can hold during the operation of mixing or during its flight through the air in air felting. Moreover, when a high-density board as described is made with such a high ratio of cement to wood, it is very difficult to nail or saw the same.

The second important limitation is the ratio of water to wood which will result in satisfactory air felting and board formation. This ratio is, in turn, dependent upon the ratio of cement to wood. The minimum ratio of water to wood for a cement to wood ratio of 1.5 is about 80 parts of water to 100 parts of wood. The maximum ratio of water to wood for a ratio of cement to wood of 5 is about 220 parts of water to 100 parts of wood.

A third ratio which operates is that of water to cement. For a cement to wood ratio of about 5, the maximum of water to cement that can be tolerated is about 120 parts of water to about 100 parts of cement, or 1.2. For a cement to wood ratio of 1.5, the minimum ratio of water to cement is about 40 parts of water to about 100 parts of cement, or 0.4.

It will be understood that when the cement to wood ratios are selected, the water to cement ratio will be inherently established thereby. It is necessary to provide sufficient moisture in the shavings to ensure proper setting or hydration of the cement, and also to ensure adhesion of the cement to the wood shavings during the mixing and in the flight to the moving support. When there is an excess of water for a given amount of cement, there is a tendency for the coated shavings to clump together and it is difficult to tear them apart in the operation of air felting. When the amount of water used is inadequate some of the cement does not adhere adequately to the wood strands, and is consequently not retained by the strands or flakes during mixing, and some is also lost in the felting operation. The resultant board may consequently be weak because the water required for proper hydration of the cement is not available, and some of the cement may have been lost. It follows, therefore, that the amount of water used is critical. For each particular cement-to-wood ratio, there will be an optimum ratio of water to wood.

As a specific example of one combination of ratios which forms a satisfactory commercial product, the ratio of cement to wood was maintained at 2.5. At this ratio of cement to wood, the water to cement ratio ranged from about 0.48 to 0.75. These ratios resulted in the limits of water to wood from 1.2 to 1.88 with an optimum ratio of about 1.6.

A second specific example of a satisfactory commercial product utilized a cement to wood ratio of 4. The water-to-cement ratio for satisfactory air felting ranged from 0.45 up to 0.55 and the water-to-wood ratio therefore ranged from about 1.8 up to 2.2 with an optimum ratio of about 2.0.

*Table 1*

TESTS TO DETERMINE THE EFFECT OF THE AMOUNT OF WATER ON THE STRENGTH OF EMBEDDED FIBER BOARD
[Specimens made at a pressure of 150 p.s.i. maintained for 16 hours, using short excelsior fibers randomly distributed.]

| Wt. of Materials in lb. | | | Ratios | | | Spec. Gravity | Modulus of rupt., p.s.i. |
| --- | --- | --- | --- | --- | --- | --- | --- |
| Cement | Wood | Water | $\frac{Cement}{Wood}$ | $\frac{Water}{Wood}$ | $\frac{Water}{Cement}$ | | |
| 100 | 33.5 | 50 | 3 | 1.5 | 0.5 | 1.22 | 2,770 |
| 100 | 33.5 | 55 | 3 | 1.6 | .55 | 1.20 | 2,640 |
| 100 | 33.5 | 60 | 3 | 1.8 | .60 | 1.12 | 1,550 |
| 100 | 33.5 | 70 | 3 | 2.1 | .70 | 1.12 | 980 |
| 100 | 33.5 | 80 | 3 | 2.4 | .80 | 1.12 | 970 |
| 100 | 33.5 | 90 | 3 | 2.7 | .90 | 1.05 | 480 |
| 100 | 25 | 40 | 4 | 1.6 | .40 | 1.36 | 3,490 |
| 100 | 25 | 45 | 4 | 1.8 | .45 | 1.38 | 3,520 |
| 100 | 25 | 50 | 4 | 2.0 | .50 | 1.39 | 2,980 |
| 100 | 25 | 55 | 4 | 2.2 | .55 | 1.33 | 2,620 |
| 100 | 25 | 60 | 4 | 2.4 | .60 | 1.35 | 2,370 |
| 100 | 25 | 75 | 4 | 3.0 | .75 | 1.25 | 2,030 |

Table 1 shows the test results of various boards made in accordance with the present disclosure. All of the specimens were made at 150 p.s.i. for 16 hours and in every instance the water was added to the dry strands before adding the powdered cement. The table shows the effect of the amount of water on the bending strength and density for two ratios of cement to wood. The amount of cement was held constant throughout the tests. Two different amounts of wood were used in order to obtain 3:1 and 4:1 ratios of cement to wood. It will be noted that as the amount of water was increased, the density of the specimens decreased slightly, and the modulus of rupture was substantially reduced.

It was noted that if the water-to-wood ratios exceeded about 1.8 and 2.2 for the cement to wood ratios of 3 and 4, respectively, the cement coated strands would adhere to each other and form clumps that produced a board of non-uniform density, whereas when less water was used, the cement coating was relatively granular and the coated strands could be individually separated and deposited by the felting machine.

The specimens of Table 1 were made without stops to control the thickness. They are therefore compacted more and their density is higher than that of specimens made with stops controlling the thickness.

Another series of tests was made in which ½-inch stops were used to control the thickness. The results of the tests on specimens so made are tabulated in Table 2. The extent to which the strands held the cement in the operated in air felting were noted. If a high ratio of water to wood was used the shavings or strands would cling together in mixing to form clumps and these clumps would not break up in the operation of air felting. Such loss of cement due to a low water ratio or such clumping due to excess moisture results in unsatisfactory air felting and board formation.

*Table 2.—Embedded Fiber Board*

TESTS TO DETERMINE THE EFFECT OF WATER-TO-WOOD RATIOS ON THE AIR FELTING PROCESS

[Hemlock Strands, length 1-inch. Portland Cement. Specimens pressed to ½-inch stops. Pressure maintained for 16 hours. Each strength value an average of two test specimens. The ratios are based on weight. The maximum load is the load in the cross-bending test.]

| Spec. No. | Ratios Cement/Wood | Ratios Water/Wood | Wt. lb./sq. ft. | Sp. Gr. | Max. load, lb. | Modulus of rupture p.s.i. | Observations Product | Observations Air Felting |
|---|---|---|---|---|---|---|---|---|
| 1 | 1.5 | .6 | 2.65 | 0.95 | 124 | 1,460 | Fair Strength. Hydration inadequate. | Unsatisfactory. Cement does not adhere adequately. |
| 2 | 1.5 | .8 | 2.72 | 1.02 | 181 | 2,300 | Good strength. Uniform formation. | Satisfactory. |
| 3 | 1.5 | 1.1 | 2.70 | 1.02 | 163 | 2,100 | ----do---- | Do. |
| 4 | 1.5 | 1.8 | 2.60 | 0.97 | 135 | 1,600 | Fair strength. Formation fair. | Questionable. Some clumping. |
| 5 | 1.5 | 2.4 | 2.58 | 0.95 | 119 | 1,500 | Fair strength. Formation non-uniform. | Unsatisfactory. Severe clumping. |
| 6 | 3 | .8 | 2.87 | 1.09 | 88 | 1,160 | Fair strength. Hydration inadequate. | Unsatisfactory. Cement does not adhere adequately. |
| 7 | 3 | 1 | 3.04 | 1.14 | 94 | 1,220 | Fair strength. Hydration appears inadequate. | Unsatisfactory. Some loss of cement. |
| 8 | 3 | 1.8 | 3.08 | 1.17 | 142 | 1,880 | Good strength. Uniform formation. | Satisfactory. |
| 9 | 3 | 1.8 | 3.04 | 1.12 | 121 | 1,520 | ----do---- | Do. |
| 10 | 3 | 2.4 | 2.82 | 1.08 | 91 | 1,220 | Fair strength. Formation non-uniform. | Unsatisfactory. Severe clumping. |
| 11 | 5 | 1.2 | 3.45 | 1.37 | 128 | 1,850 | Fair strength. Hydration inadequate | Unsatisfactory. Cement does not adhere adequately. |
| 12 | 5 | 1.8 | 4.13 | 1.57 | 209 | 2,740 | Good strength. Uniform formation. | Satisfactory. |
| 13 | 5 | 2.2 | 4.06 | 1.54 | 145 | 1,900 | Fair strength. Uniform formation. | Do. |
| 14 | 5 | 2.4 | 4.12 | 1.53 | 157 | 1,980 | Fair strength. Formation non-uniform. | Unsatisfactory. Some clumping. |
| 15 | 5 | 2.6 | 3.91 | 1.40 | 153 | 1,780 | ----do---- | Unsatisfactory. Severe clumping. |

The tests of Table 2 show the effect of varying the amount of water on air felting and establish the ratios of water-to-wood for several ratios of cement-to-water. Satisfactory air felting means that the cement adheres to the wood strands adequately in the mixing of the cement with the wet strands and that substantially all the cement clings to the strands when these are pulled out of an advancing mass of coated strands by the picker roll and thrown through the air in their progress to the moving cauls below. It also means that the strands do not clump or bunch together as they are pulled out of the mass of strands but are thrown through the air substantially as individual coated strands. Good air felting results in good board formation. The strength tests made on the specimens produced show that when the formation is good, satisfactory strengths are also obtained. When clumping or bunching occurs the board formation is non-uniform, and if insufficient cement adheres to the shavings or strands the strength falls off due to loss of cement.

While the limits of the ratios of water to wood that can be used cannot be set with great exactness, the tests and observations made combined with those previously made do indicate approximate optimum ratios. The optimum ratios of water-to-wood for a number of ratios of cement-to-wood will be found in Table 3. Substantial departures from the optimum values will result in unsatisfactor air felting and consequently in a board with infactory air felting and consequently in a board with incement-to-wood increases the optimum ratio of water-to-wood also increases.

Whereas the preferred form of the invention has been shown and described herein, it should be realized that there are many modifications, substitutions and alterations thereto within the scope of the following claims.

*Table 3*

[Optimum ratios of water to wood for various ratios of cement to wood required to obtain good air felting combined with satisfactory strength.]

| Cement/Wood | Water/Wood |
|---|---|
| 1.5 | 1.0 |
| 2.5 | 1.6 |
| 3.0 | 1.8 |
| 4.0 | 2.0 |
| 5.0 | 2.2 |

I claim:

1. In the process of making a non-porous building board composed of wood shavings and Portland cement having a density of 0.9 to 1.4 in which the ratio of the weight of the cement to the weight of the wood shavings is more than 1.5 but less than 5, the steps of mixing water, shavings and cement until all the cement adheres to the shavings; moving a mass of said coated shavings toward a separating station; removing individual coated shavings from the advancing mass, throwing the coated shavings through the air so they freely fall onto a moving support without loss of cement, forming a continuous layer of loosely felted coated shavings, and pressing said layer of loosely felted coated shavings.

2. The method of claim 1 further characterized in that the ratio of the weight of the cement to the wood is about 2.5, and the ratio of the water to the wood is about 1.6.

3. The method of claim 1 further characterized in that the ratio of the weight of the cement to the wood is about 3, and the ratio of the water to the wood is about 1.8.

4. The method of claim 1 further characterized in that the ratio of the weight of the cement to the wood is about 4, and the ratio of the water to the wood is about 2.0.

5. The method of claim 1 further characterized in that the ratio of the weight of the cement to the wood is about 5, and the ratio of the water to the wood is about 2.2.

6. In the process of making a non-porous building board composed of wood shavings and Portland cement having a density of 0.9 to 1.4 in which the ratio of the weight of the cement to the wood shavings is about 1.5 to 5.0, the steps of simultaneously mixing the water, wood shavings, and cement until all the cement adheres to the shavings, moving a mass of said coated shavings toward a separating station; removing individual coated shavings from the advancing mass; throwing the coated shavings through the air so they freely fall onto a moving caul plate without loss of cement, and forming a continuous layer of loosely felted coated shavings, and pressing said layer of loosely felted coated shavings.

References Cited by the Examiner

UNITED STATES PATENTS

| | | | |
|---|---|---|---|
| 2,689,975 | 9/1954 | Leng | 264—109 |
| 2,697,677 | 12/1954 | Elmendorf | 161—151 |
| 2,923,030 | 2/1960 | Himmelheber et al. | 264—118 |
| 2,947,654 | 8/1960 | Chapman | 264—109 XR |
| 2,992,152 | 7/1961 | Chapman | 264—109 |
| 3,096,227 | 7/1963 | Van Elten | 264—109 XR |

ALEXANDER H. BRODMERKEL, *Primary Examiner.*

P. E. ANDERSON, *Assistant Examiner.*